US010853000B2

(12) United States Patent
    Itogawa

(10) Patent No.: US 10,853,000 B2
(45) Date of Patent: Dec. 1, 2020

(54) IMAGE PROCESSING APPARATUS AND STORAGE MEDIUM

(71) Applicant: Brother Kogyo Kabushiki Kaisha, Nagoya (JP)

(72) Inventor: Yoshihiro Itogawa, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/261,707

(22) Filed: Jan. 30, 2019

(65) Prior Publication Data

US 2019/0235797 A1 Aug. 1, 2019

(30) Foreign Application Priority Data

Jan. 31, 2018 (JP) .................................. 2018-014268

(51) Int. Cl.
    *G06F 3/12* (2006.01)
    *G06F 40/114* (2020.01)
    *G06F 40/258* (2020.01)

(52) U.S. Cl.
    CPC ............ *G06F 3/1204* (2013.01); *G06F 3/125* (2013.01); *G06F 3/1256* (2013.01); *G06F 3/1298* (2013.01); *G06F 40/114* (2020.01); *G06F 40/258* (2020.01)

(58) Field of Classification Search
    None
    See application file for complete search history.

(56) References Cited

U.S. PATENT DOCUMENTS

| 7,619,772 | B2 | 11/2009 | Fukudome |
| 8,634,100 | B2 | 1/2014 | Hashimoto |
| 2003/0053133 | A1 | 3/2003 | Nakagiri et al. |
| 2006/0238810 | A1 | 10/2006 | Fukudome |
| 2007/0162427 | A1* | 7/2007 | Yamaoka ............... G06F 21/577 |
| 2007/0242282 | A1 | 10/2007 | Hashimoto |
| 2015/0002894 | A1 | 1/2015 | Adachi |
| 2016/0004695 | A1* | 1/2016 | Yang ..................... G06F 3/0482 |
|  |  |  | 707/738 |

(Continued)

FOREIGN PATENT DOCUMENTS

| JP | 2003-162520 A | 6/2003 |
| JP | 2006-301927 A | 11/2006 |
| JP | 2007-283675 A | 11/2007 |

(Continued)

*Primary Examiner* — Frantz Bataille
(74) *Attorney, Agent, or Firm* — Banner & Witcoff, Ltd.

(57) ABSTRACT

An image processing apparatus configured to: receive a target file including m page data relating to m pages and classification data classifying the m page data into n groups, m being an integer of 3 or larger, and n being an integer of 2 or larger and smaller than m; receive information of a designated character string; extract specific page data relating to a page including the designated character string from the m page data by analyzing the target file; determine a specific group of the n groups by using the classification data, the specific group including the extracted specific page data; determine one or more target page data to be output of the page data included in the specific group, the one or more target page data including page data different from the specific page data; and output the one or more target page data.

20 Claims, 11 Drawing Sheets

(56) References Cited

U.S. PATENT DOCUMENTS

2016/0019008 A1* 1/2016 Matsumoto ........... G06F 3/1256
 358/1.13
2018/0232487 A1* 8/2018 Erard .................... G16H 40/20

FOREIGN PATENT DOCUMENTS

| JP | 2015-012505 A | 1/2015 |
| JP | 2017-083920 A | 5/2017 |

* cited by examiner

FIRST ILLUSTRATIVE EMBODIMENT

SECOND ILLUSTRATIVE EMBODIMENT

THIRD ILLUSTRATIVE EMBODIMENT

IMAGE PROCESSING APPARATUS AND STORAGE MEDIUM

CROSS-REFERENCE TO RELATED APPLICATIONS

This application claims priority from Japanese Patent Application No. 2018-014268 filed on Jan. 31, 2018, the entire contents of which are incorporated herein by reference.

TECHNICAL FIELD

The present disclosure relates to a technology for outputting one or more page data by using a target file including a plurality of page data.

BACKGROUND

A printing apparatus disclosed in related art searches for a designated keyword from document data when the keyword is designated by a user. The printing apparatus prints a page including the searched keyword.

However, since it cannot be said that the simple printing of the page including the searched keyword conforms to a user's intention, the technology has a possibility that a page appropriate to the user may not be printed. This problem is not limited to the above case where the page is to be printed, and also occurs in a case where one or more page data is to be output.

SUMMARY

It is therefore an object of the present disclosure to provide a technology with which it is possible to output page data appropriate to a user when outputting one or more page data of a plurality of page data.

According to an aspect of the disclosure, there is provided an image processing apparatus including: a processor; and a memory storing instructions, the instructions, when executed by the processor, causing the image processing apparatus to perform: receiving a target file including m page data relating to m pages and classification data classifying the m page data into n groups, m being an integer of 3 or larger, and n being an integer of 2 or larger and smaller than m; receiving information of a designated character string which is a character string designated by a user; extracting specific page data relating to a page including the designated character string from the m page data by analyzing the target file: determining a specific group of the n groups by using the classification data, the specific group including the extracted specific page data; determining one or more target page data to be output of the page data included in the specific group, the one or more target page data including page data different from the specific page data relating to the page including the designated character string; and outputting the one or more target page data.

According to the above configuration, the specific group including the specific page data, which indicates the page including the designated character string, is determined using the classification data. One or more target page data, which includes the page data different from the specific page data, of one or more page data included in the specific group is determined. As a result, when outputting one or more page data, it is possible to output page data appropriate to the user.

In the meantime, the technology of the present disclosure can be implemented in diverse forms such as a printing apparatus, a control device of the printing apparatus, an image processing method, a computer program for implementing the functions of the apparatus and method, a storage medium having the computer program recorded therein, and the like.

DETAILED DESCRIPTION

A. First Illustrative Embodiment

A-1. Configuration of Image Processing Apparatus

Figure 1:
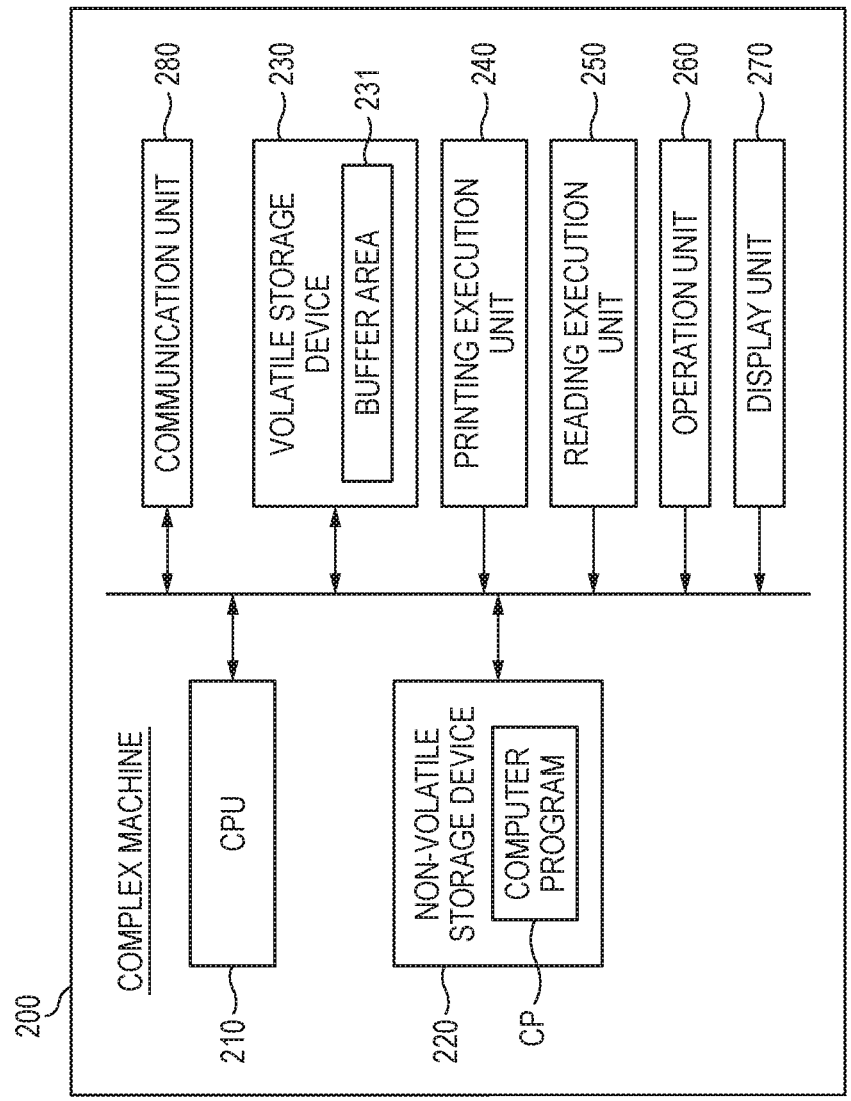
FIG. 1 is a block diagram depicting a configuration of a complex machine 200, which is an image processing apparatus of an illustrative embodiment.

An illustrative embodiment is described. FIG. 1 is a block diagram depicting a configuration of a complex machine 200, which is an image processing apparatus of an illustrative embodiment.

The complex machine 200 includes, for example, a CPU 210, which is a processor as a controller of the complex machine 200, a non-volatile storage device 220 such as a hard disk drive, a volatile storage device 230 such as a RAM, a printing execution unit 240, a reading execution unit 250, an operation unit 260 such as a touch panel superimposed on a liquid crystal panel, a button and the like, a display unit 270 such as a liquid crystal monitor, and a communication unit 280 including an interface for performing communication with an external device such as a terminal device (not shown).

The printing execution unit 240 is a device configured to print an image on a sheet (an example of the printing medium) in a predetermined manner (for example, a laser manner or an inkjet manner). The reading execution unit 250 is a device configured to optically read a target such as a document by using a photoelectric conversion element such as a CCD, a CMOS and the like, thereby generating scan data indicative of the read image.

The volatile storage device 230 has a buffer area 231 in which a variety of intermediate data, which is generated when the CPU 210 executes processing, is temporarily stored. In the non-volatile storage device 220, a computer program CP is stored. In the first illustrative embodiment, the computer program CP may be provided with being stored in advance in the non-volatile storage device 220 upon the manufacturing of the complex machine 200. Instead, the computer program CP may be downloaded from a server connected via the Internet or may be provided with being recorded in a CD-ROM and the like.

The CPU 210 is configured to execute control processing of the complex machine 200 including controls of the printing execution unit 240 and the reading execution unit 250 by executing the computer program CP. Also, the CPU 210 is configured to execute printing processing, which will be described later.

The communication unit 280 includes a USB interface for performing data communication in accordance with USB (Universal Serial Bus) standards. Therefore, it is possible to connect an external storage device such as a USB memory to the communication unit 280. The communication unit 280 may further include an interface for performing data communication with an external device such as a terminal device (not shown) via a network, specifically, a wired or wireless interface based on Ethernet (registered trademark) or Wi-Fi standards.

A-2. Printing Processing

Figure 2:
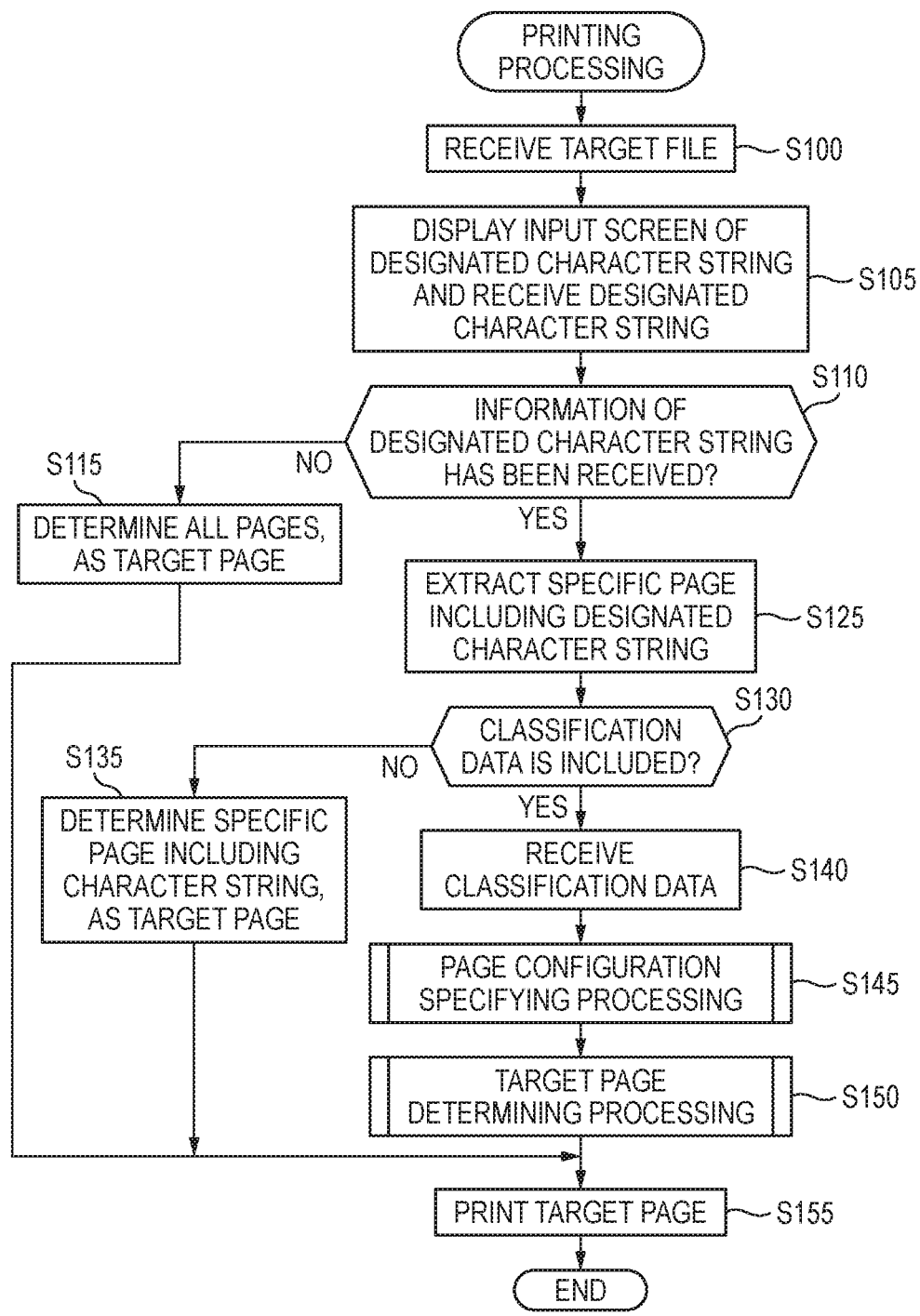
FIG. 2 is a flowchart of printing processing.

FIG. 2 is a flowchart of the printing processing. The printing processing is executed in a case where a printing instruction of a PDF file in a USB memory is received from a user in a state where the USB memory is connected to the communication unit 280 of the complex machine 200, for example.

Figure 3:
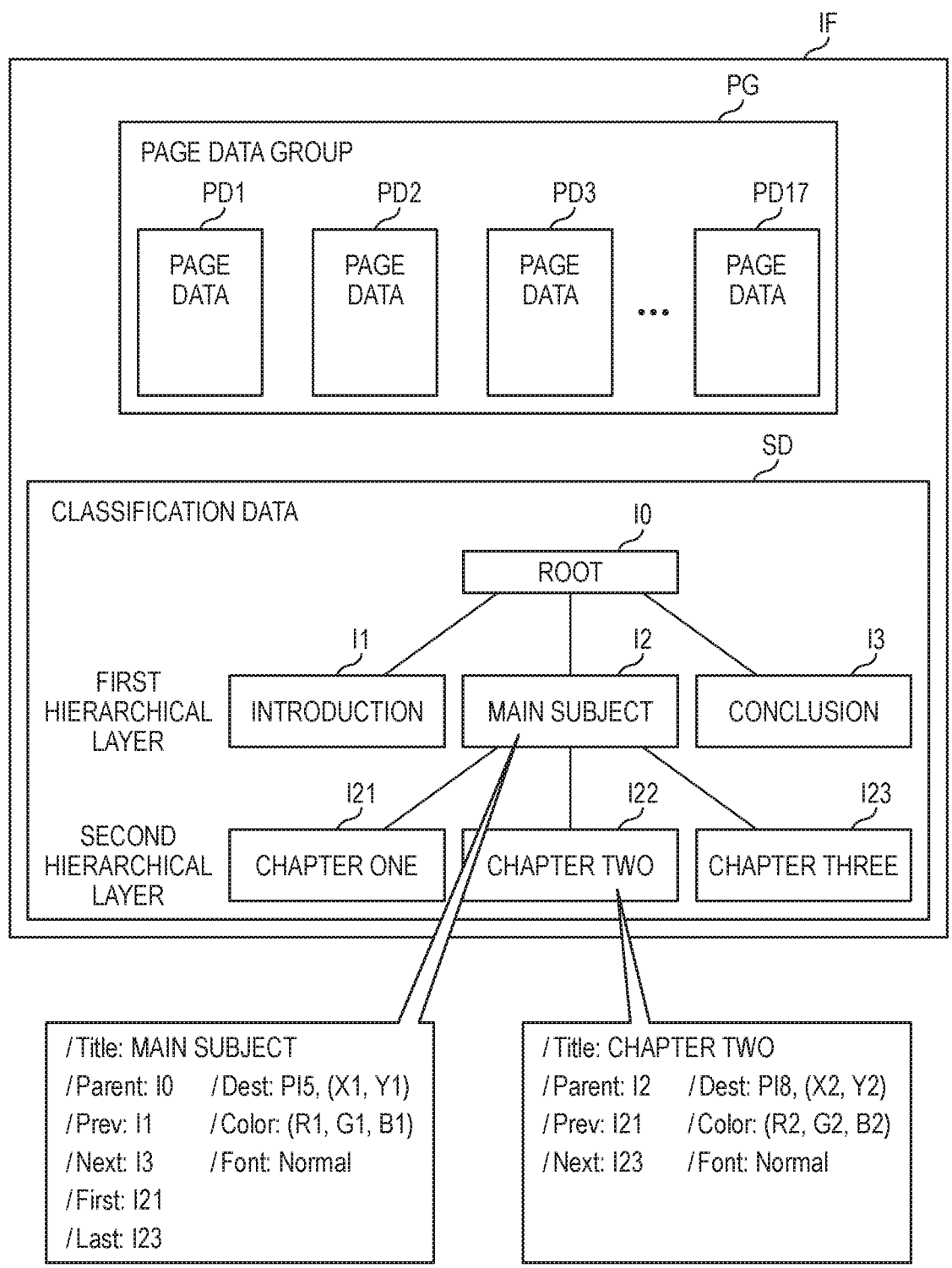
FIG. 3 is a schematic view of an example of a target file IF.
Figure 4:
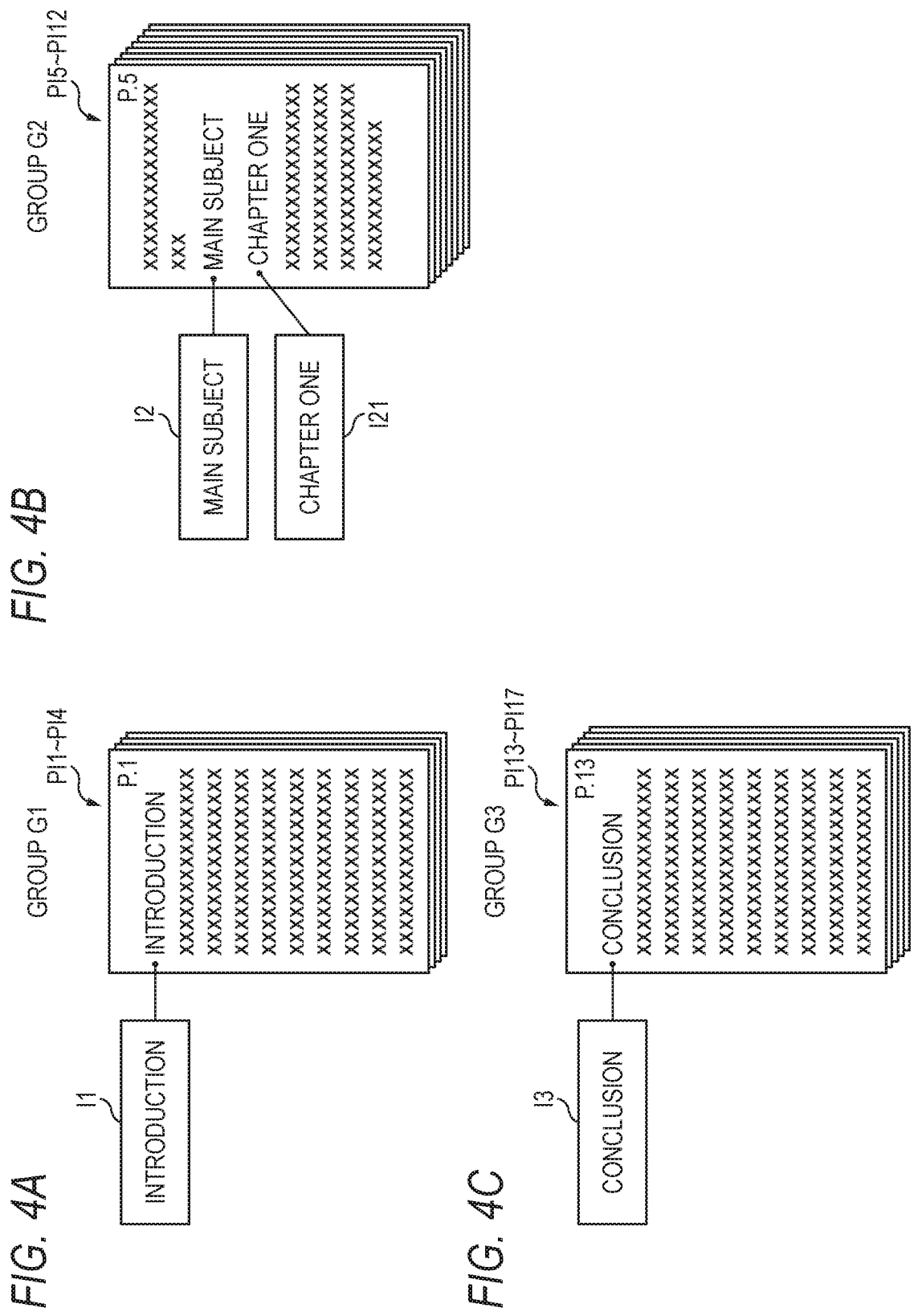
FIGS. 4A to 4C are first conceptual diagrams of a document that is to be expressed by the target file IF of FIG. 3.
Figure 5:
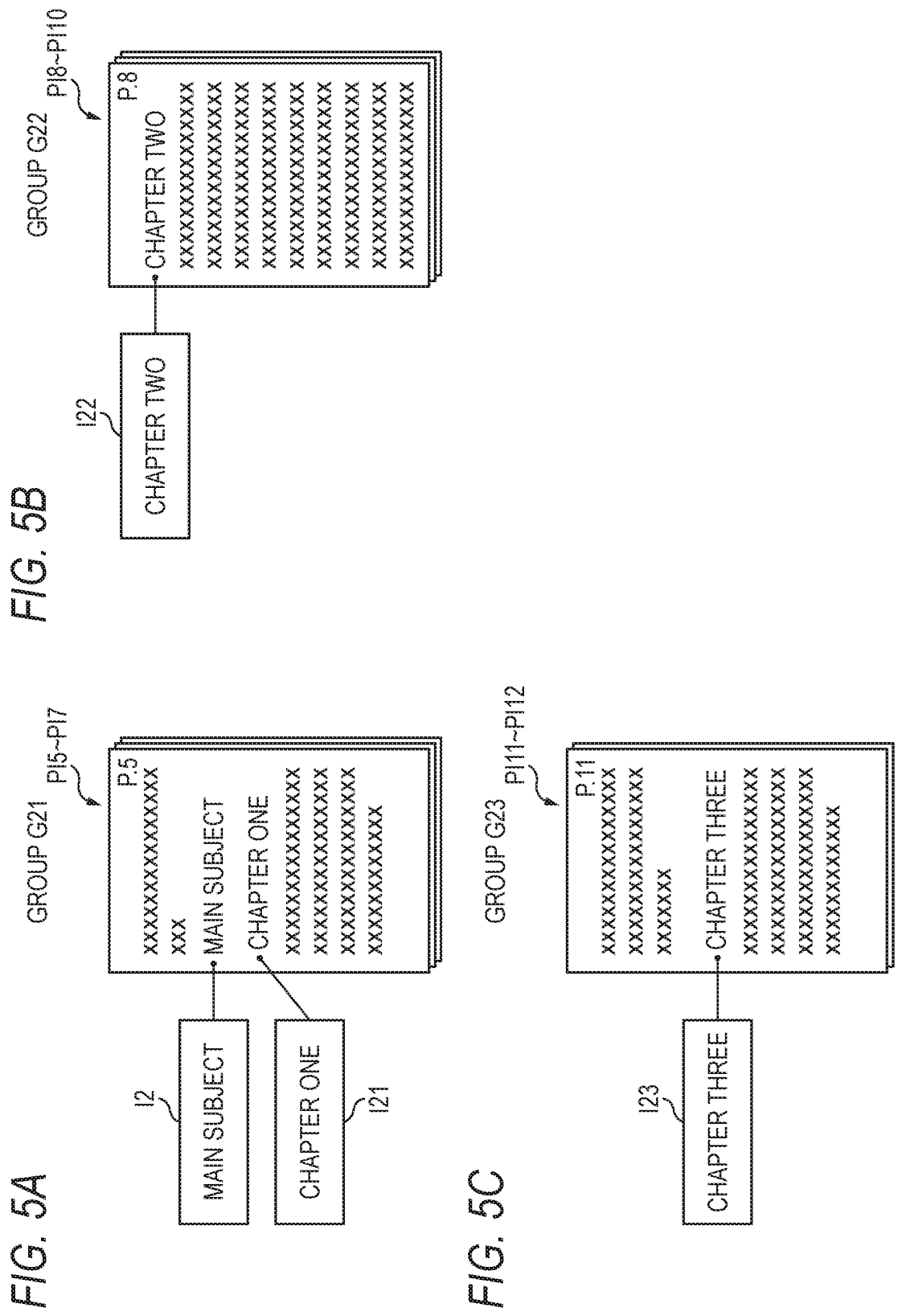
FIGS. 5A to 5C are second conceptual diagrams of a document that is to be expressed by the target file IF of FIG. 3.

In S100, the CPU 210 receives a document file (hereinafter, also referred to as 'target file') of a printing target, which is designated by the user, from the USB memory. The designation of the target file is received through the operation unit 260, together with the printing instruction. FIG. 3 is a schematic view of an example of the target file IF. FIGS. 4A to 4C and 5A to 5C are conceptual diagrams of a document that is to be expressed by the target file IF of FIG. 3. The target file IF is a document file relating to a document of m pages. Specifically, the target file IF includes information in which a document of m pages is defined, and is used so as to output the document of the m pages. In the first illustrative embodiment, the target file IF is a so-called PDF file having a file format referred to as PDF (abbreviation of Portable Document Format).

The target file IF includes a page data group PG which includes m page data PD relating to m pages PI. Here, m is an integer of 3 or larger. The target file IF may further include classification data SD associated with the m page data PD, like an example shown in FIG. 3. Each page data PD is image data in which one page PI is described using a drawing command conforming to the PDF format. One page PI is expressed as a printing image or a display image by using one corresponding page data PD, for example.

In the example of FIGS. 3 and 4A to 4C, the target file IF includes seventeen page data PD1 to PD17 (m=17) relating to seventeen pages PI1 to PI17 (refer to FIGS. 4A to 4C). For each of the plurality of page data PD (i.e., each of the plurality of pages PI), a page order is defined. The integers of the page data PD1 to PD17 shown in FIG. 3 and the pages PI1 to PI17 shown in FIGS. 4A to 4C and 5A to 5C are numbers indicative of page orders.

In the first illustrative embodiment, the classification data SD is data referred to as bookmark information (document outline) in a PDF. In general, the classification data SD is data that is to be used when displaying a page, which is to be expressed by a PDF file, on a viewer by using the PDF file. More specifically, the classification data SD indicates information that can be displayed independently of each page when a page to be expressed by each page data in the PDF file is displayed on the viewer. For example, the information indicated by the classification data SD is displayed in an operation window different from a screen (hereinafter, referred to as 'page window') on which a page is displayed. The operation window is a screen for receiving an operation from the user, and includes, for example, a plurality of selection options, which indicates a plurality of item information (which will be described later) included in the classification data SD. For example, in a state where a page PI1 of FIG. 4A is displayed in the page window, when a selection option, which indicates item information I22 (which will be described later), of the plurality of selection options in the operation window is selected by the user, the page displayed in the page window moves from the page PI1 to a page PI8 associated with the item information I22. Like this, the classification data SD can be said as data for expressing an operation screen that is to be displayed together with a display screen of a page when displaying the page. The operation screen can be said as a screen that is to be used so as for the user to operate display of the page.

The classification data SD has a tree structure in which the plurality of item information is associated in a tree form. The tree structure is a hierarchy structure having three hierarchical layers. For example, as shown in FIG. 3, the classification data SD includes item information I0 of a root, item information I1 to I3 of a first hierarchical layer associated with the item information I0 of the root, and item information I21 to I23 of a second hierarchical layer associated with the item information I2 of the first hierarchical layer. In a modified embodiment, the classification data SD may further have a multi-layered tree structure. For example, the classification data SD may include item information of a third hierarchical layer associated with the item information of the second hierarchical layer.

The classification data SD is described more specifically. Each of the plurality of item information I1 to I3 and I21 to I23 included in the classification data SD includes a plurality of entries, i.e., /Title, /Parent, /Prev, /Next, /First, /Last, /Dest, /Color and /Font. The entry '/Title' is text data indicative of a character string indicating a tile of the item information. For example, the entry '/Title' of the item information I2 shown in FIG. 3 is "main subject", and the entry 'Title' of the item information I22 is "chapter two". The entry '/Parent' is an entry indicative of the item information of the upper hierarchical layer associated with the item information. For example, the entry '/Parent' of the item information I2 indicates the item information I0, and the entry '/Parent' of the item information I22 indicates the item information I2. The entry '/Prev' is an entry indicative of item information, which is located immediately before, of the item information belonging to the same hierarchical layer. For example, the entry 'Prev' of the item information I2 indicates the item information I1, and the entry '/Prev' of the item information I22 indicates the item information I21. The entry '/Next' is an entry indicative of item information, which is located immediately after, of the item information belonging to the same hierarchical layer. For example, the entry '/Next' of the item information I2 indicates the item information I3, and the entry '/Next' of the item information I22 indicates the item information I23. The entry '/First' is an entry indicative of first item information of the item information belonging to the hierarchical layer located immediately below. For example, the entry '/First' of the item information I2 indicates the item information I21. The entry '/Last' is an entry indicative of final item information of the item information belonging to the hierarchical layer located immediately below. For example, the entry '/Last' of the item information I2 indicates the item information I23. Since there is no item information belonging to a hierarchical layer lower than the item information I22, the entries '/First' and '/Last' of the item information I22 are omitted. The entry '/Dest' is data indicative of a page PI associated with the item information and a position in the page PI. For example, the entry '/Dest' of the item information I2 indicates a page PI5, which is a fifth page, and the entry '/Dest' of the item information I22 indicates a page PI8, which is an eighth page. The entry '/Color' is an entry indicative of a character color of the character string indicating the title of the item information. For the character color, the number of gradation numbers of each component is indicated by RGB values of 256 gradations. The entry '/Font' is an entry indicative of a font of the character string indicating the title of the item information.

Each of the plurality of item information I1 to I3 and I21 to I23 includes the entry '/Dest', so that it is associated with any one of the seventeen pages PI1 to PI17. For example, as shown in FIGS. 4A to 4C, the page PI1 of the first page is associated with the item information I1 of the first hierarchical layer, and the page PI5 of the fifth page is associated with the item information I2 of the first hierarchical layer. Also, the page PI13 of the thirteenth page is associated with the item information I3 of the first hierarchical layer. Also, as shown in FIGS. 5A to 5C, the page PI5 of the fifth page is associated with the item information I21 of the second hierarchical layer, the page PI8 of the eighth page is associated with the item information I22 of the second hierarchical layer, and the page PI11 of the eleventh page is associated with the item information I23 of the second hierarchical layer.

By the classification data SD, the m pages PI and the m page data PD associated with the m pages PI are classified into n groups. Here, n is an integer of 2 or larger and smaller than m. In the example of FIGS. 3 to 5C, the seventeen pages PI1 to PI17 (and the corresponding seventeen page data PD1 to PD17) are classified into six groups.

Specifically, as shown in FIGS. 4A to 4C, the seventeen pages PI1 to PI17 are classified into three groups G1 to G3 of the first hierarchical layer by the item information I1 to I3 of the first hierarchical layer. The group G1 is a group including four pages PI1 to PI4 from the page PI1 associated with the item information I1 to the page PI4 immediately before the page PI5 associated with the next item information I2 of the same hierarchical layer as the item information I1. The group G2 is a group including eight pages PI5 to PI12 from the page PI5 associated with the item information I2 to the page PI12 immediately before the page PI13 associated with the next item information I3 of the same hierarchical layer as the item information I2. The group G3 is a group including five pages PI13 to PI17 from the page PI13 associated with the item information I3 to the page PI17, which is a final page.

Also, as shown in FIGS. 5A to 5C, the eight pages PI5 to PI12 included in the group G2 are classified into three groups G21 to G23 of the second hierarchical layer by the item information I21 to I23 of the second hierarchical layer. The group G21 is a group including three pages PI5 to PI7 from the page PI5 associated with the item information I21 to the page PI7 immediately before the page PI8 associated with the next item information I22 of the same hierarchical layer as the item information I21. The group G22 is a group including three pages PI8 to PI10 from the page PI8 associated with the item information I22 to the page PI10 immediately before the page PI111 associated with the next item information I23 of the same hierarchical layer as the item information I22. The group G23 is a group including two pages PI11 and PI12 from the page PI11 associated with the item information I23 to the page PI12, which is a final page of the eight pages included in the group G2.

Again referring to FIG. 2, in S105, the CPU 210 displays an input screen W1 for inputting a character string to be designated by the user (hereinafter, referred to as 'designated character string') on the display unit 270, and receives information of the designated character string through the input screen W1.

Figure 6:
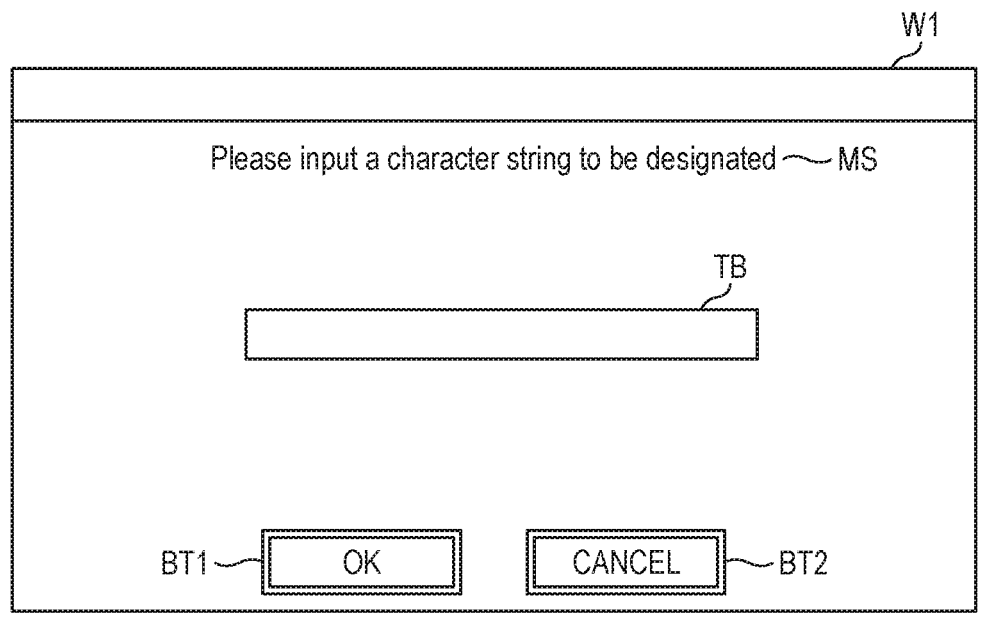
FIG. 6 depicts an example of an input screen W1.

FIG. 6 depicts an example of the input screen W1. The input screen W1 of FIG. 6 includes a message MS for urging the user to input the designated character string, an input column TB for inputting the designated character string, an OK button BT1 and a cancel button BT2. When the OK button BT1 is pushed in a state where the designated character string is input in the input column TB, the CPU 210 receives the information of the designated character string input in the input column TB, and proceeds to S110. When the cancel button BT2 is pushed, the CPU 210 proceeds to S110 without receiving the information of the designated character string. The designated character string may be any single word or a sentence, for example.

In S110, the CPU 210 determines whether the information of the designated character string has been received in S105. In a case where it is determined that the information of the designated character string has not been received (S110: NO), the CPU determines all of the pages relating to the target file IF, as a target page, in S115. That is, in the example of FIG. 3, the seventeen pages PI1 to PI17 relating to the seventeen page data PD1 to PD17 included in the target file IF are determined as the target page. When the target page is determined, the CPU 210 proceeds to S155.

In a case where it is determined that the information of the designated character string has been received (S110: YES), the CPU 210 analyzes the target file IF and extracts one or more page (hereinafter, also referred to as 'specific page') including the designated character string from the seventeen pages PI1 to PI17 of the target file IF, in S125. In the target file IF, character data indicative of characters included in each page is included. The CPU 210 searches for the designated character string from the character data included in the target file IF, and extracts one or more specific pages included in the designated character string. In a modified embodiment, the CPU 210 may execute character identifying processing, which is used in the well-known OCR (Optical Character Recognition) technology, for each page data and generate character data indicative of characters included in each page. Then, the CPU may search for the designated character string from the character data, and extract one or more specific pages including the designated character string. Here, it is assumed that the two specific pages of the page PI3, which is a third page, and the page PI10, which is a tenth page, are extracted. Here, the extraction of the specific page from the m pages is equivalent to extraction of page data (also referred to as 'specific page data') relating to the specific page from the m page data relating to the m pages.

In S130, the CPU 210 determines whether the classification data SD is included in the target file IF. In a case where it is determined that the classification data SD is not included (S130: NO), the CPU 210 determines, as the target page, the one or more extracted specific pages, in S135. When the target page is determined, the CPU 210 proceeds to S155.

In a case where it is determined that the classification data SD is included (S130: YES), the CPU 210 receives the classification data SD included in the target file IF, in S140.

In S145, the CPU 210 executes page configuration specifying processing of specifying a page configuration of the target file IF by using the classification data SD. By the page configuration specifying processing, a configuration of the groups G1 to G3 shown in FIGS. 4A to 4C and a configuration of the groups G21 to G23 shown in FIGS. 5A to 5C are specified as the page configuration of the target file IF. The page configuration specifying processing will be described in detail later.

In S150, the CPU 210 executes target page determining processing of determining a target page to be printed from the seventeen pages PI1 to PI17 of the target file IF. The target page determining processing is executed using an extraction result of the specific page in S125 and a specifying result of the page configuration in S145. In the meantime, the seventeen pages PI11 to PI17 and the seventeen page data correspond to each other one to one. Therefore, the determining of the target page to be printed from the seventeen page PI1 to PI17 can be said as the determining of the target page data, which is used for printing, from the seventeen page data PD1 to PD17. When the target page determining processing is executed, the CPU 210 proceeds to S155.

In S155, the CPU 210 enables the printing execution unit 240 to print the target page determined in any one of S114, S135 and S155. That is, specifically, the CPU 210 generates print data by using the target page data relating to the target page, and controls the printing execution unit 240 by using the print data, thereby enabling the printing execution unit 240 to print the target page.

A-3. Page Configuration Specifying Processing

Figure 7:
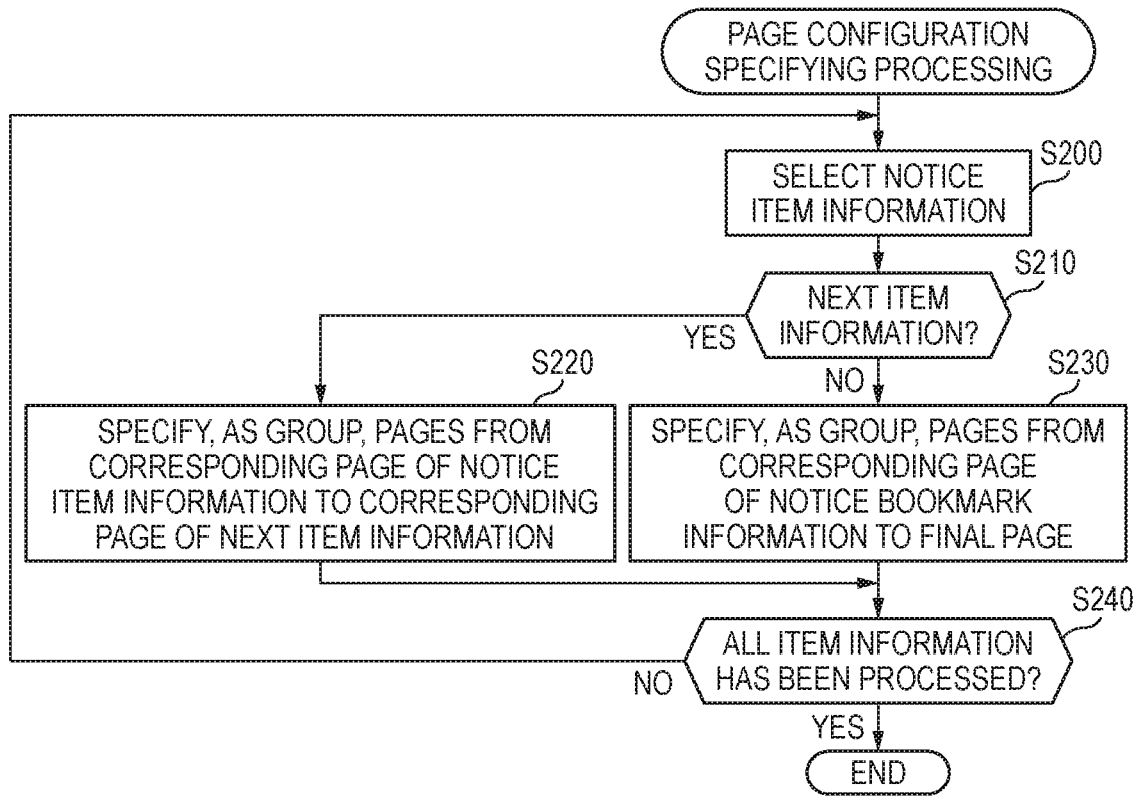
FIG. 7 is a flowchart of page configuration specifying processing.

The page configuration specifying processing of S145 shown in FIG. 2 is described. FIG. 7 is a flowchart of the page configuration specifying processing. In the page configuration specifying processing, the n groups are specified using the classification data SD in which the m page data (m=17, in the example of FIG. 7) is classified into n groups (n=6, in the example of FIGS. 4A to 4C and 5A to 5C).

In S200, the CPU 210 selects one notice item information from the plurality of item information I1 to I3 and I21 to I23 (FIG. 3) included in the classification data SD. For example, the item information I1 to I3 of the upper hierarchical layer is sequentially selected as the notice information, and then the item information I21 to I23 of the lower hierarchical layer is sequentially selected as the notice information.

In S210, the CPU 210 determines whether there is the next item information in the same hierarchical layer as the notice item information. Specifically, in a case where there is the separate item information described in the entry '/Next' of the notice item information, the CPU determines that there is the next item information. For example, in a case where the item information I1, I2, I21, I22 of FIG. 3 is the notice item information, the CPU determines that there is the next item information, and in a case where the item information I3, I23 is the notice item information, the CPU determines that there is no next item information.

In a case where it is determined that there is the next item information (S210: YES), in S220, the CPU 210 specifies, as a group corresponding to the notice item information, pages from a corresponding page of the notice item information to a page immediately before a corresponding page of the next item information of the notice item information. The corresponding page of the notice item information is a page with which the notice item information is associated, i.e., a page that is described in the entry '/Dest' of the notice item information. As the corresponding page of the next item information, a page with which the next item information is associated, i.e., a page that is described in the entry '/Dest' of the next item information is specified. For example, in a case where the item information I2 of FIG. 3 is the notice item information, the group G2 of FIG. 4B is specified. In a case where the item information I22 of FIG. 3 is the notice item information, the group G22 of FIG. 5B is specified.

In a case where it is determined that there is no next item information (S210: NO), in S230, the CPU 210 specifies, as the group corresponding to the notice item information, pages from the corresponding page of the notice item information to a final page. The final page is a final page of the page order of one or more pages belonging to the group corresponding to the item information of the upper hierarchical layer with which the item information is associated. Here, it is assumed that the pages belonging to the group corresponding to the item information I0 of the root are all of the pages, i.e., the pages PI11 to PI17. For example, in a case where the notice item information is the item information I3, since the item information of the upper hierarchical layer of the item information I3 is the item information I0 of the root, the final page is the page PI17. In a case where the notice item information is the item information I23, the final page is the final page PI12 of the pages PI5 to PI12 belonging to the group G2 corresponding to the item information I2 of the upper hierarchical layer. For example, in a case where the item information I3 of FIG. 3 is the notice item information, the group G3 of FIG. 4C is specified. In a case where the item information I23 of FIG. 3 is the notice item information, the group G23 of FIG. 5C is specified.

In S240, the CPU 210 determines whether all of the item information has been processed as the notice item information. In a case where it is determined that there is the not-processed item information (S240: NO), the CPU 210 returns to S200. In a case where it is determined that all of the item information has been processed (S240: YES), the CPU 210 ends the page configuration specifying processing. Thereby, the n groups are all specified. For example, in the classification data SD of FIG. 3, the six groups G1 to G3 and G21 to G23 described in FIGS. 4A to 4C and 5A to 5C are specified.

A-4. Target Page Determining Processing

Figure 8:
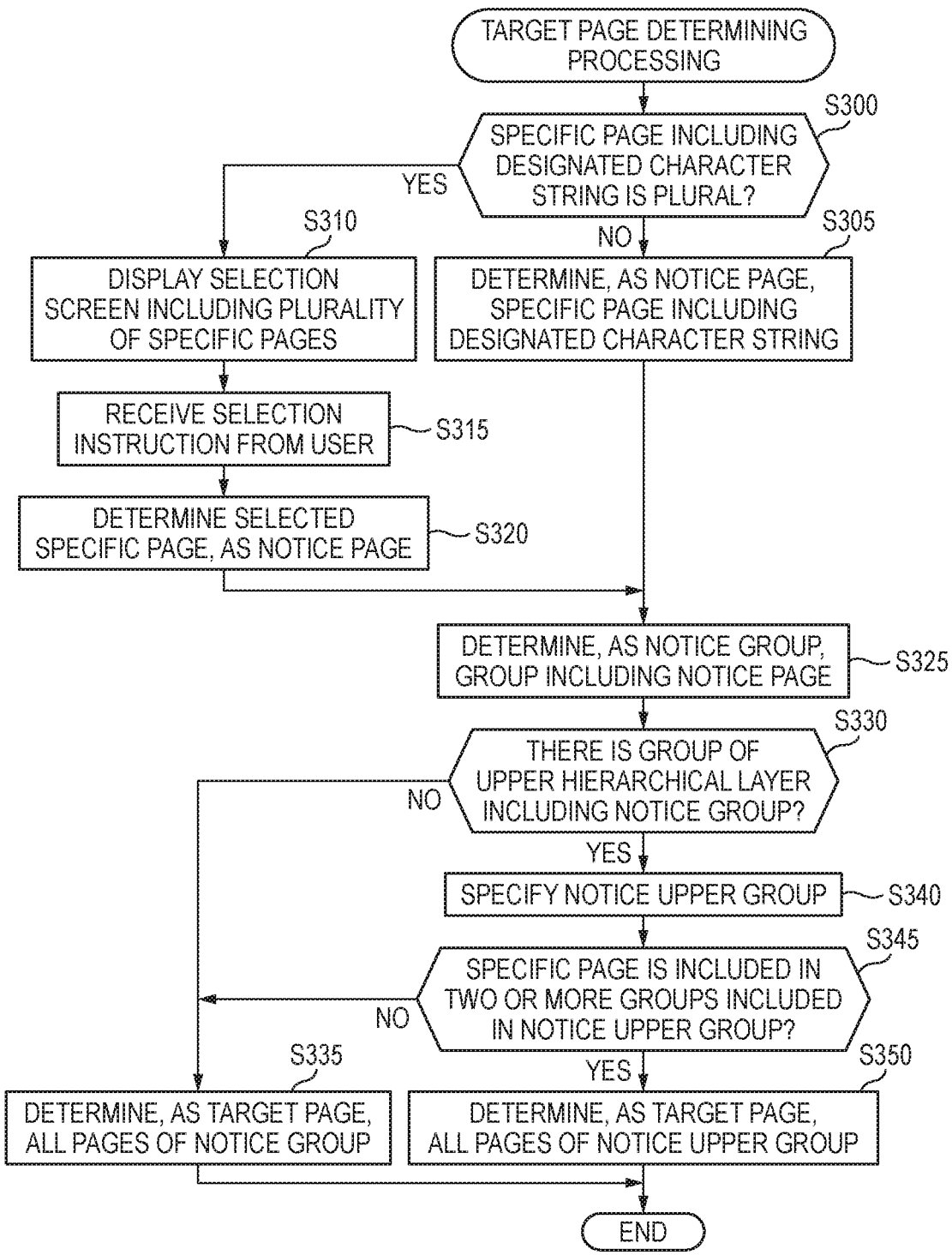
FIG. 8 is a flowchart of target page determining processing of a first illustrative embodiment.

The target page determining processing of S150 of FIG. 2 is described. FIG. 8 is a flowchart of the target page determining processing of the first illustrative embodiment. In the target page determining processing, one or more target pages to be printed are determined from the m pages (m=17, in the example of FIG. 3).

In S300, the CPU 210 determines whether the specific page including the designated character string extracted in S125 of FIG. 2 is plural.

In a case where it is determined that the specific page including the designated character string is not plural (S300: NO), i.e., in a case where it is determined that the specific page including the designated character string is one, the CPU 210 determines the one specific page, as a notice page, in S305. When the notice page is determined, the CPU 210 proceeds to S325.

In a case where it is determined that the specific page including the designated character string is plural (S300: YES), the CPU 210 displays, on the display unit 270, a selection screen W2 including images of the plurality of specific pages, in S310.

Figure 9:
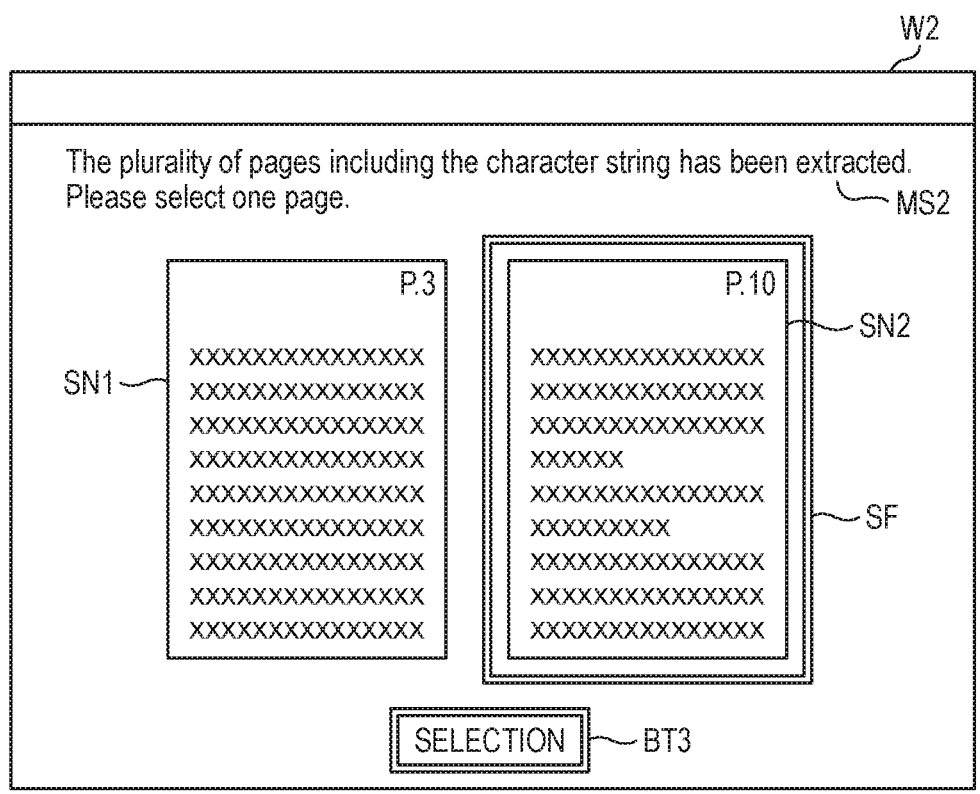
FIG. 9 depicts an example of a selection screen W2.

FIG. 9 depicts an example of the selection screen W2. The selection screen W2 of FIG. 9 includes a message MS2 for urging the user to select one specific page from the plurality of specific pages, thumbnail images SN1, SN2, each of which expressing each of the plurality of specific pages, and a selection button BT3. The thumbnail images SN1, SN2 are displayed using reduced page data, which is generated using the page data indicative of the specific pages. The selection screen W2 of FIG. 9 is a screen that is displayed in a case where two specific pages of the page PI3, which is the third page, and the page PI10, which is the tenth page, are extracted. For this reason, the selection screen W2 includes the thumbnail image SN1 indicative of the page PI3 and the thumbnail image SN2 indicative of the page PI10.

In S315, the CPU 210 receives a selection instruction to select one page from the plurality of specific pages through the selection screen W2, from the user. For example, when the selection button BT3 is pushed in a state where any one of the thumbnail images SN1, SN2 is selected by a selection frame SF in the selection screen W2, the CPU 210 receives a selection instruction of the specific page corresponding to the selected thumbnail image.

In S320, the CPU 210 determines, as the notice page, one specific page selected by the received selection instruction. When the notice page is determined, the CPU 210 proceeds to S325.

In S325, the CPU 210 determines, as a notice group, a group including the determined notice page from the n groups specified in the page configuration specifying processing of S145 of FIG. 2. In a case where the notice page is included in the plurality of groups belonging to the different hierarchical layers, a group belonging to the lowest hierarchical layer is selected as the notice group. For example, in a case where the page PI3 of the third page is the notice page, the group G1 (FIG. 4A) of the first hierarchical layer is determined as the notice group. Also, in a case where the page PI10 of the tenth page is the notice page, the group G22 (FIG. 5B) of the second hierarchical layer is determined as the notice group.

In S330, the CPU 210 determines whether there is a group (also referred to as 'notice upper group') of the upper hierarchical layer including the notice group. For example, in a case where the group G1 of the first hierarchical layer is the notice group, it is determined that there is no notice upper group. In a case where the group G22 of the second hierarchical layer is the notice group, since there is the group G2 including the group G22, it is determined that there is the notice upper group.

In a case where it is determined that there is no notice upper group (S330: NO), in S335, the CPU 210 determines, as the target page, all of the pages included in the notice group. For example, in a case where the group G1 of the first hierarchical layer is the notice group, the four pages PI1 to PI4 (FIG. 4A) included in the group G1 are determined as the target page.

In a case where it is determined that there is the notice upper group (S330: YES), in S340, the CPU 210 specifies the notice upper group. For example, in a case where the group G22 of the second hierarchical layer is the notice group, the group G2 including the group G22 is specified.

In S345, the CPU 210 determines whether the specific page including the designated character string is included in two or more groups belonging to the notice upper group. For example, in a case where the group G2 is the notice upper group, the CPU determines whether the specific page is included in two or more groups of the three groups G21 to G23 belonging to the group G2. For example, in this case, in a case where the specific page including the designated character string is included in another group (for example, the group G23) belonging to the group G2, in addition to the notice group (for example, the group G22), it is determined that the specific page is included in two or more groups. In a case where the specific page including the designated character string is not included in any of the groups (for example, the groups G23, G21) different from the notice group (for example, the group G22), it is determined that the specific page is not included in two or more groups.

In a case where it is determined that the specific page is not included in two or more groups belonging to the notice upper group (S345: NO), in S335, the CPU 210 determines, as the target page, all of the pages included in the notice group. For example, in a case where the group G22 of the second hierarchical layer is the notice group, the three pages PI8 to PI10 (FIG. 5B) included in the group G22 are determined as the target page. The pages PI1 to PI7 and PI11 to PI17, which are not included in the group G22, are not determined as the target page.

In a case where it is determined that the specific page is included in two or more groups belonging to the notice upper group (S345: YES), in S350, the CPU 210 determines, as the target page, all of the pages included in the notice upper group. For example, in a case where the group G22 of the second hierarchical layer is the notice group, the eight pages PI5 to PI12, which are included in the group G2 of the upper hierarchical layer of the group G22, are determined as the target page. The pages PI1 to PI4 and PI13 to PI17, which are not included in the group G2, are not determined as the target page.

According to the first illustrative embodiment, the CPU 210 analyzes the target file IF and extracts the specific page data relating to the specific page from the m page data (S125 in FIG. 2). The CPU 210 determines the group including the extracted specific page data by using the classification data SD (S325 in FIG. 8). The CPU 210 determines, as the target page, all of the pages included in the group including the specific page (S335, S350 in FIG. 8). In other words, the CPU 210 determines, as the target page data, all of the page data included in the group including the specific page. The target page data includes all of the page data included in the group. The CPU 210 prints the target page by using the target page data (S155 in FIG. 2). As a result, when printing one or more pages, it is possible to print the pages appropriate to the user.

For example, even when only the specific page including the designated character string has been printed, it may be not sufficient for the user. According to the first illustrative embodiment, not only the specific page including the designated character string but also all of the pages included in the specific group including the specific page are printed. As a result, the designated character string is designated by the user, so that the pages appropriate to the user can be printed.

Also, in the first illustrative embodiment, the two specific pages including the designated character string, specifically, the page data PD3 relating to the page PI3 and the page data PD10 relating to the page PI10 can be extracted (S125 in FIG. 2). In this case, the CPU 210 displays the page PI3 and the page PI10, and receives the page selection instruction from the user (S310, S315 in FIG. 8, FIG. 9). In a case where the selection instruction to select the page PI3 is received, the CPU 210 prints all of the pages PI1 to PI4 included in the group G1 including the page PI3, and in a case where the selection instruction to select the page PI10 is received, the CPU 210 prints all of the pages PI8 to PI10 included in the group G22 including the page PI10 (S320, S335 in FIG. 8). As a result, it is possible to print the pages more appropriate to the user, in correspondence to the selection instruction of the specific page issued by the user.

Also, according to the first illustrative embodiment, the classification data SD indicates the hierarchy structure including one or more groups G1 to G3 of the first hierarchical layer including the group G2, and the groups of the second hierarchical layer including the groups G21 to G23 of the second hierarchical layer, which is a lower layer of the group G2 (FIGS. 3 to 5C). In a case where a specific condition, which indicates that the group G22 is the specific group including the specific page (specific page data), is satisfied (S345: YES, in FIG. 8), the CPU 210 determines, as the target page, all of the pages included in the group G2 belonging to the upper hierarchical layer of the group G22, i.e., determines all of the page data, as the target page data (S350 in FIG. 8). As a result, it is possible to print the pages more appropriate to the user by using the classification data SD indicative of the hierarchy structure.

In the first illustrative embodiment, the specific condition is that each of the two or more groups, which include the group G22, of the groups G21 to G23 of the second hierarchical layer included in the group G2 includes the specific page including the designated character string (S345 in FIG. 8). As a result, it is possible to output the page data more appropriate to the user. For example, in a case where the designated character string is included relatively much in the groups G21 to G23 of the second hierarchical layer, it is thought that it is favorable to the user to print the whole upper group G2, rather than to print only the group, which includes the page including the designated character string, of the groups G21 to G23 of the second hierarchical layer.

As can be seen from the above descriptions, the page PI3 of the first illustrative embodiment is an example of the first page, the page PI10 is an example of the second page, the page data PD3 is an example of the first specific page data, and the page data PD10 is an example of the second specific page data. Also, the group G2 is an example of the first group, and the group G22 is an example of the second group.

B. Second Illustrative Embodiment

Figure 10:
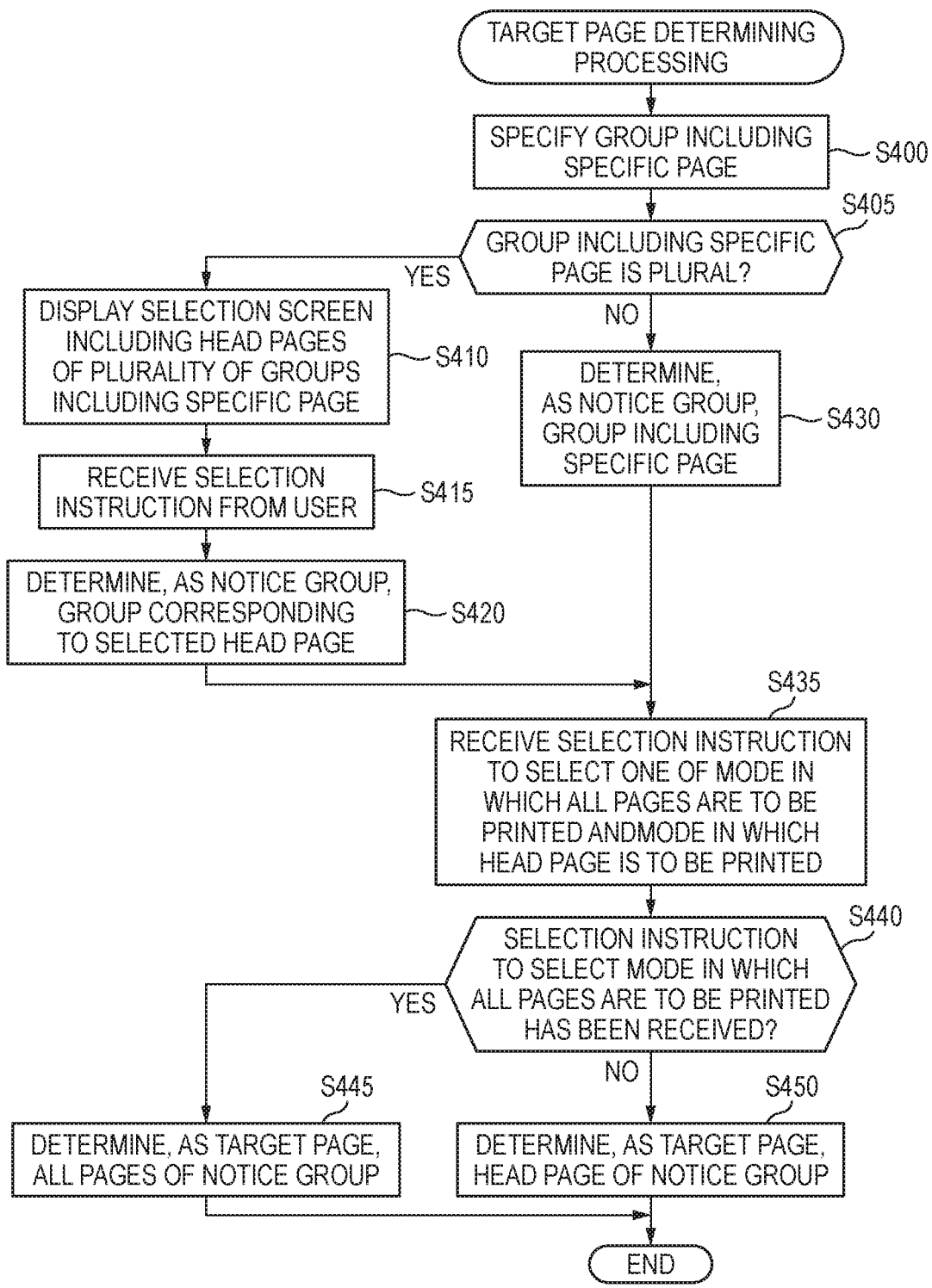
FIG. 10 is a flowchart of target page determining processing of a second illustrative embodiment.

In a second illustrative embodiment, the target page determining processing is different from the first illustrative embodiment. The processing of the second illustrative embodiment is the same as the first illustrative embodiment, except the target page determining processing. FIG. 10 is a flowchart of the target page determining processing of the second illustrative embodiment.

In S400, the CPU 210 specifies a group, which includes the specific page, of the n groups specified in the page configuration specifying processing of S145 of FIG. 2. Specifically, a group including the specific page, which includes the designated character string extracted in S125 of FIG. 2, is specified. In a case where the specific page is included in the plurality of groups belonging to the different hierarchical layers, the group of the lowest hierarchical layer is specified. For example, in a case where the page PI3 of the third page and the page PI10 of the tenth page are extracted as the specific page, the group G1 of FIG. 4A and the group G22 of FIG. 5B are specified as the group including the specific page.

In S405, the CPU 210 determines whether the group including the specific page is plural. In a case where it is determined that the group including the specific page is not plural (S405: NO), i.e., in a case where it is determined that the group including the specific page is one, in S430, the CPU 210 determines, as the notice group, the group including the specific page. When the notice page is determined, the CPU 210 proceeds to S435.

In a case where it is determined that the group including the specific page is plural (S405: YES), in S410, the CPU 210 displays, on the display unit 270, a selection screen W3 including images of head pages of the plurality of groups including the specific page.

Figure 11A:
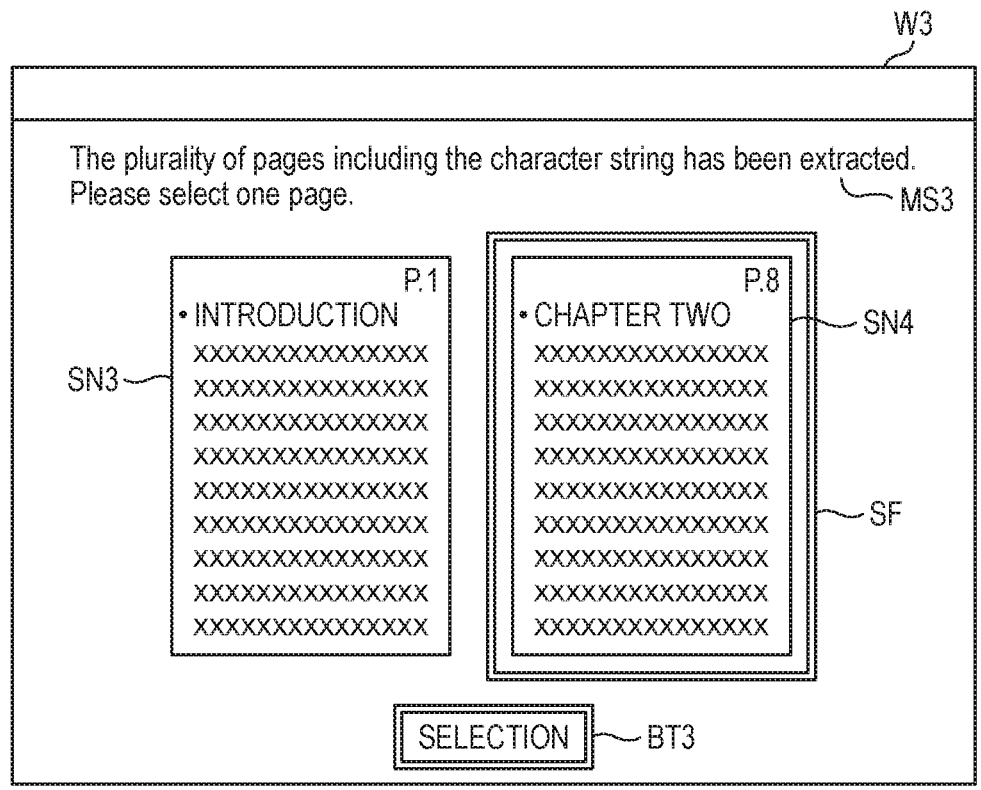
FIGS. 11A and 11B depict an example of the selection screen.
Figure 11B:
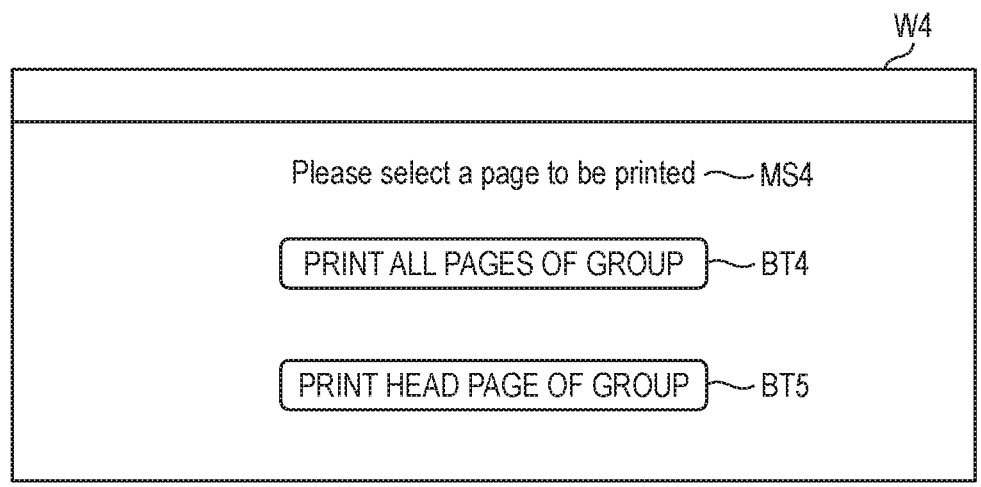

FIGS. 11A and 11B depict an example of the selection screen. The selection screen W3 of FIG. 11A includes a message MS3 for urging the user to select one group from the groups including the plurality of specific pages, thumbnail images SN3, SN4 each of which expresses the head page of each of the plurality of groups, and a selection button BT3. The thumbnail images SN3, SN4 are displayed using reduced page data, which is generated using the page data indicative of the head page of each group. In a case where the page PI3 of the third page and the page PI10 of the tenth page are extracted as the specific page, the thumbnail image SN3 of the head page PI1 of the group G1 shown in FIG. 4A and the thumbnail image SN4 of the head page PI10 of the group G22 shown in FIG. 5B are displayed on the selection screen W3 (FIG. 11A). In the meantime, the head page of the group including the specific page is determined on the basis of the configuration of the group specified using the classification data SD in the page configuration specifying processing. Therefore, the head page can be said as the page that is to be determined using the classification data SD.

In S415, the CPU 210 receives a selection instruction to select one head page from the head pages of the plurality of groups including the specific page, through the selection screen W3, from the user. For example, when the selection button BT3 is pushed in a state where any one of the thumbnail images SN3, SN4 is selected by the selection frame SF in the selection screen W3, the CPU 210 receives the selection instruction of the head page corresponding to the selected thumbnail image.

In S420, the CPU 210 determines, as the notice group, a group corresponding to one head page selected by the received selection instruction. When the notice page is determined, the CPU 210 proceeds to S435.

In S435, the CPU 210 receives a selection instruction to select one of a first mode in which all of the pages of the notice group are to be printed and a second mode in which only the head page of the notice group is to be printed. In the second illustrative embodiment, the CPU 210 displays a selection screen W4 of FIG. 11B on the display unit 270, and receives the selection instruction through the selection screen W4. The selection screen W4 of FIG. 11B includes a message MS4 for urging the user to select one of the first mode and the second mode, a button BT4 for inputting an instruction to select the first mode, and a button BT5 for inputting an instruction to select the second mode. The CPU 210 receives the selection instruction of the mode corresponding to the pushed button of the buttons BT4, BT5.

In S440, the CPU 210 determines whether the selection instruction of the first mode, in which all of the pages of the notice group are to be printed, has been received in S435. In a case where it is determined that the selection instruction of the first mode has been received (S440: YES), in S445, the CPU 210 determines, as the target page, all of the pages included in the notice group. In a case where it is determined that the selection instruction of the first mode has not been received (S440: NO), i.e., in a case where it is determined that the selection instruction of the second mode, in which only the head page is to be printed, has been received, in S450, the CPU 210 determines, as the target page, the head page of the notice group.

According to the second illustrative embodiment, the page data PD3 relating to the page PI3 including the designated character string and the page data PD10 relating to the page PI10 can be extracted (S125 in FIG. 2). In this case, the CPU 210 displays the head page PI1 of the group G1 including the page PI3 and the head page PI8 of the group G22 including the page PI10, and receives the selection instruction of the page from the user (S410, S415 in FIG. 10; FIGS. 11A and 11B). In a case where the selection instruction to select the page PI1 is received, the CPU 210 prints all of the pages PI1 to PI4 or the head page PI1 included in the group G1 corresponding to the page PI1, and in a case where the selection instruction to select the page PI8 is received, the CPU 210 prints all of the pages PI8 to PI10 or the head page PI1 included in the group G22 corresponding to the page PI8 (S420, S445, S450 in FIG. 10). As a result, it is possible to print the pages more appropriate to the user, in correspondence to the selection instruction of the head page issued by the user.

Also, according to the second illustrative embodiment, in a case where the selection instruction to select the first mode is received (S440: YES in FIG. 10), all of the pages included in the notice group are determined as the target page, i.e., all of the page data included in the notice group is determined as the target page data (S445 in FIG. 10). In a case where the selection instruction to select the second mode is received (S440: NO in FIG. 10), only the head page included in the notice group is determined as the target page, i.e., only the page data relating to the head page included in the notice group is determined as the target page data (S450 in FIG. 10). As a result, it is possible to print the pages more appropriate to the user by using the selection instruction of the mode issued by the user.

As can be seen from the above descriptions, the page PI3 of the second illustrative embodiment is an example of the first page, the page PI10 is an example of the second page, the page PI1 is an example of the third page, and the page PI8 is an example of the fourth page. Also, the page data PD3 is an example of the first specific page data, and the page data PD10 is an example of the second specific page data. Also, the group G2 is an example of the first group, and the group G22 is an example of the second group.

C. Third Illustrative Embodiment

Figure 12:
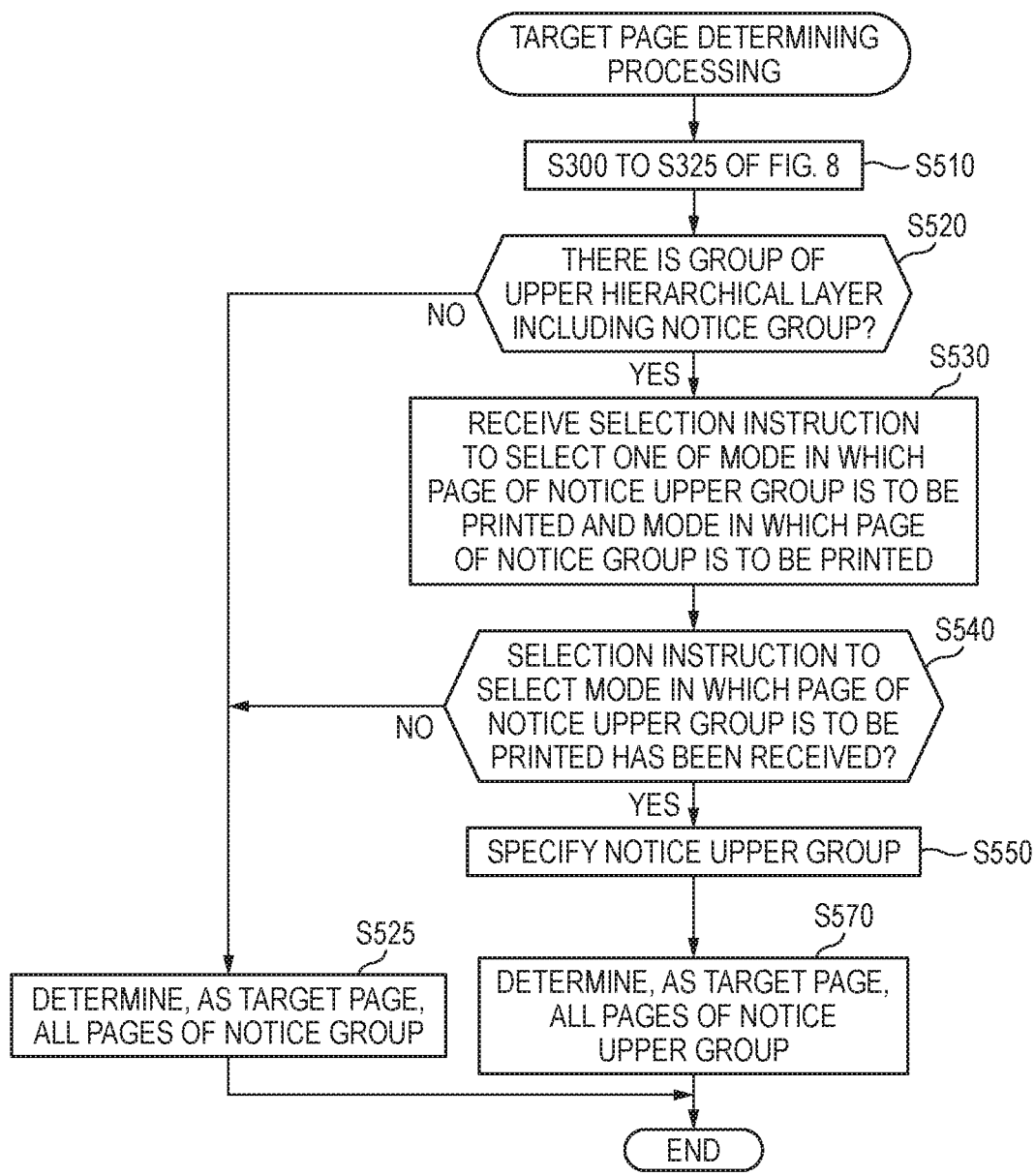
FIG. 12 is a flowchart of target page determining processing of a third illustrative embodiment.

In a third illustrative embodiment, the target page determining processing is different from the first illustrative embodiment. The processing of the third illustrative embodiment is the same as the first illustrative embodiment, except the target page determining processing. FIG. 12 is a flowchart of the target page determining processing of the third illustrative embodiment.

In S510, the CPU 210 executes processing of S300 to S325 in FIG. 8. Thereby, the notice group is determined. In S520, the CPU 210 determines whether there is the group (notice upper group) of the upper hierarchical layer including the notice group. For example, in a case where the group G1 of the first hierarchical layer is the notice group, it is determined that there is no notice upper group. In a case where the group G22 of the second hierarchical layer is the notice group, since there is the group G2 including the group G22, it is determined that there is the notice upper group.

In a case where it is determined that there is no notice upper group (S520: NO), in S525, the CPU 210 determines, as the target page, all of the pages included in the notice group. For example, in a case where the group G1 of the first hierarchical layer is the notice group, the four pages PI1 to PI4 (FIG. 4A) included in the group G1 are determined as the target page.

In a case where it is determined that there is the notice upper group (S520: YES), in S530, the CPU 210 receives a selection instruction to select one of a third mode, in which the page of the notice upper group is to be printed, and a fourth mode, in which the page of the notice group is to be printed. For example, the CPU 210 displays a predetermined selection screen (not shown) on the display unit 270, and receives the selection instruction through the selection screen. The predetermined selection screen includes a message for urging the user to select one of the third mode and the fourth mode, a button for inputting an instruction to select the third mode, and a button for inputting an instruction to select the fourth mode. The CPU 210 receives the selection instruction of the mode corresponding to the pushed button of the buttons.

In S540, the CPU 210 determines whether the selection instruction of the third mode, in which the page of the notice upper group is to be printed, has been received in S530. In a case where it is determined that the selection instruction of the third mode has been received (S540: YES), in S550, the CPU 210 specifies the notice upper group. For example, in a case where the group G22 of the second hierarchical layer is the notice group, the group G2 including the group G22 is specified.

In S570, the CPU 210 determines, as the target page, all of the pages included in the notice upper group. For example, in a case where the group G22 of the second hierarchical layer is the notice group, the eight pages PI5 to PI12 (FIG. 4B) included in the group G2 of the upper hierarchical layer of the group G22 are determined as the target page. The pages PI1 to PI4 and PI13 to PI17, which are not included in the group G2, are not determined as the target page.

In a case where it is determined that the selection instruction of the third mode has not been received (S540: YES), i.e., in a case where it is determined that the selection instruction of the fourth mode, in which the page of the notice group is to be printed, has been received, in S525, the CPU 210 determines, as the target page, all of the pages included in the notice group. For example, in a case where the group G22 of the second hierarchical layer is the notice group, the three pages PI8 to PI110 (FIG. 5B) included in the group G22 are determined as the target page. The pages PI5 to PI7 and PI11 to PI12, which are included in the other groups G21, G23 belonging to the group G2, are not determined as the target page.

According to the third illustrative embodiment, in a case where the group G22 is the notice group including the specific page (for example, the page PI10) and the selection instruction to select the third mode is received (S540: YES in FIG. 12), all of the pages PI5 to PI12 included in the group G2, which is the notice upper group, are determined as the target page, i.e., all of the page data PD5 to PD12 included in the group G2 is determined as the target page data (S570 in FIG. 12). In a case where the group G22 is the notice group including the specific page and the selection instruction to select the fourth mode is received (S540: NO in FIG. 12), the pages PI8 to PI10 included in the group G22 are determined as the target page, i.e., all of the page data PD8 to PD10 included in the group G22 is determined as the target page data (S525 in FIG. 12). In this case, the pages PI5 to PI7 and PI11 to PI12, which are included in the group G2 and are not included in the group G22, are not determined as the target page.

According to the third illustrative embodiment, it is possible to print the pages more appropriate to the user by using the classification data SD indicative of the hierarchy structure and the selection instruction issued from the user.

As can be seen from the above descriptions, the group G2 of the third illustrative embodiment is an example of the first group, and the group G22 is an example of the second group.

D. Modified Embodiments (1) In the first illustrative embodiment, in a case where the plurality of specific pages is extracted, the whole group including the page, which is selected by the selection instruction of the user, of the plurality of specific pages is printed. Instead of this configuration, the plurality of groups, each of which includes any one of the plurality of specific pages, may be entirely printed. In this case, the selection instruction of the user may not be received.

(2) In S335 of the first illustrative embodiment, all of the pages of the notice group including the specific page are determined as the target page. Instead of this configuration, only the head page of the notice group may be determined as the target page or only the final page of the notice group may be determined as the target page. In general, the target page to be determined preferably includes one or more pages included in the notice group, and preferably includes a page different from the specific page. Also, the determination as to whether all of the pages of the notice group are to be determined as the target page, the determination as to whether only the head page is to be determined as the target page, and the determination as to whether only the final page is to be determined as the target page may be determined in advance or may be switched on the basis of a user's instruction.

(3) The classification data SD of each illustrative embodiment has the hierarchy structure having the first hierarchical layer and the second hierarchical layer but may have a hierarchy structure having only one hierarchical layer or three or more hierarchical layers.

(4) In the first illustrative embodiment, the specific condition for determining all of the pages of the notice upper group as the target page is that each of the two or more groups of the plurality of lower groups included in the notice upper group includes the specific page (S345 in FIG. 8). Instead of this configuration, the specific condition may be that each of the three or more or four or more groups of the lower groups includes the specific page. In general, the specific condition is preferably that each of the K or more groups of the plurality of lower groups included in the notice upper group includes the specific page. Here, K is an integer of 2 or larger.

(5) In the illustrative embodiments, the target file IF is a document file conforming to the PDF format. Instead of this configuration, a file format having a concept of a page where the page data indicative of images of the m pages can be saved in one file and capable of associating the classification data with each page may also be used. Specifically, the target file IF can adopt an XPS file format and file formats for diverse word processor applications. As the classification data, data for a function capable of specifying a page associated with the item information when referring to the item information included in the classification data, for example, a function referred to as a so-called bookmark function, a function of a table of contents and an indexing function is used, although it is different depending on the file format to be adopted.

(6) In the illustrative embodiments, in S155 of FIG. 2, the target page data is output in the aspect where the target page is printed using the target page data. Instead of this configuration, the target page data may be output in an aspect where the target page is displayed on a display device such as a liquid crystal monitor by using the target page data.

(7) In the illustrative embodiments, the complex machine 200 as the image processing apparatus configured to execute the printing processing of FIG. 2 may be a terminal device such as a personal computer and a smart phone, and may be a single printer and a display device, for example. In a case where the terminal device executes the printing processing of FIG. 2, in S155 of FIG. 2, the terminal device may generate a print job by using the target page data relating to the target page and transmit the print job to a printer connected to the terminal device.

Also, the image processing apparatus configured to execute the printing processing of FIG. 2 may be a server configured to receive the target file IF from a user's terminal or the printer 100 and to execute the image processing. The server may implement the functions of one image processing as a whole in such an aspect that a plurality of computing devices capable of performing communication with each other via a network divides the functions as the image processing apparatus. In this case, the entire plurality of computing devices capable of performing communication with each other via the network corresponds to the image processing apparatus.

(8) In the illustrative embodiments, a part of the configurations implemented by the hardware may be replaced with software, and a part or all of the configurations implemented by the software may be replaced with hardware. For example, a part of the processing that is to be executed by the CPU 210 of the complex machine 200 of FIG. 1 may be implemented by a dedicated hardware circuit.

Although the present disclosure has been described with reference to the illustrative embodiments and the modified embodiments thereof, the embodiments are provided so as to easily understand the present disclosure, not to limit the present disclosure. The present disclosure can be changed and improved without departing from the spirit and the claims, and the equivalents thereof are included in the present disclosure.

What is claimed is:

1. An image processing apparatus comprising:
 a processor;
 a monitor;
 a printing execution unit; and
 a memory storing instructions, the instructions, when executed by the processor, causing the image processing apparatus to perform:
  receiving a target file including m page data relating to m pages and classification data classifying the m page data into n groups, m being an integer of 3 or larger, n being an integer of 2 or larger and smaller than m, each of the m page data relating to a corresponding one of the m pages, and each of the n groups including at least one page data of the m page data;
  causing the monitor to display an input screen for inputting information of a character string designated by a user;
  receiving information of the designated character string through the input screen;
  extracting specific page data relating to a page including the designated character string from the m page data by analyzing the target file;
  determining a specific group of the n groups by using the classification data, the specific group including the extracted specific page data;

determining target page data to be printed by the printing execution unit of the page data included in the specific group, the target page data including the specific page data and page data different from the specific page data; and causing the printing execution unit to print the target page data.

2. The image processing apparatus according to claim 1, wherein the determining of the target page data is performed by determining all of the page data included in the specific group as the target page data.

3. The image processing apparatus according to claim 1, wherein the extracting of the specific page data is performed by extracting first specific page data relating to a first page including the designated character string and second specific page data relating to a second page including the designated character string, wherein the instructions, when executed by the processor, cause the image processing apparatus to further perform:

receiving a selection instruction of a page from the user by causing the monitor to display the first page and the second page, and wherein the determining of the target page data is performed by:

determining page data included in a first specific group including the first specific page data as the target page data, in a case where the selection instruction to select the first page is received; and determining page data included in a second specific group including the second specific page data as the target page data, in a case where the selection instruction to select the second page is received.

4. The image processing apparatus according to claim 1, wherein the instructions, when executed by the processor, cause the image processing apparatus to further perform:

receiving a selection instruction of a page from the user by causing the monitor to display the page including the designated character string, and wherein the determining of the target page data is performed by:

determining page data included in the specific group including the specific page data relating to the page being selected as the target page data, in a case where the selection instruction to select the page is received.

5. The image processing apparatus according to claim 1, wherein the extracting of the specific page data is performed by extracting first specific page data relating to a first page including the designated character string and second specific page data relating to a second page including the designated character string, wherein the instructions, when executed by the processor, cause the image processing apparatus to further perform:

receiving a selection instruction of a page from the user by causing the monitor to display a third page different from the first page and a fourth page different from the second page, the third page being included in a first specific group including the first specific page data and determined using the classification data, and the fourth page being included in a second specific group including the second specific page data and determined using the classification data, and wherein the determining of the target page data is performed by:

determining page data included in the first specific group including the first specific page data as the one or more target page data, in a case where the selection instruction to select the third page is received; and determining page data included in the second specific group including the second specific page data as the target page data, in a case where the selection instruction to select the fourth page is received.

6. The image processing apparatus according to claim 1, wherein the instructions, when executed by the processor, cause the image processing apparatus to further perform:

receiving a selection instruction of a page from the user by causing the monitor to display a classification page different from the page including the designated character string, the classification page being included in the specific group including the specific page data and determined using the classification data, and wherein the determining of the target page data is performed by:

determining page data included in the specific group including the specific page data as the target page data, in a case where the selection instruction to select the classification page is received.

7. The image processing apparatus according to claim 1, wherein the instructions, when executed by the processor, cause the image processing apparatus to further perform:

causing the monitor to display a selection screen for selecting one mode from a plurality of printing modes including a first printing mode and a second printing mode:

receiving, from the user, a selection instruction through the selection screen, and wherein the determining of the target page data is performed by:

determining all of the page data included in the specific group as the target page data, in a case where the selection instruction to select the first printing mode is received, and determining only some of the page data included in the specific group as the target page data, in a case where the selection instruction to select the second printing mode is received.

8. The image processing apparatus according to claim 1, wherein the classification data indicates a hierarchy structure including: one or more groups of a first hierarchical layer including a first group; and a group of a second hierarchical layer including a second group, the second hierarchical layer being a lower hierarchical layer than the first hierarchical layer, and wherein the determining of the target page data is performed by:

determining all of the page data included in the first group as the target page data, in a case where a specific condition, which includes a condition that the second group is the specific group including the specific page data, is satisfied.

9. The image processing apparatus according to claim 8, wherein the instructions, when executed by the processor, cause the image processing apparatus to further perform:

causing the monitor to display a selection screen for selecting one mode from a plurality of printing modes including a third printing mode and a fourth printing mode;

receiving, from the user, a selection instruction through the selection screen, wherein the determining of the target page data is performed by:

determining all of the page data included in the first group as the target page data, in a case where the second group is the specific group including the specific page data and the selection instruction to select the third printing mode is received; and determining page data included in the second group as the target page data and not determining page data included in the first group and not included in the second group as the target page data, in a case where the second group is the specific group comprising the specific page data and the selection instruction to select the fourth printing mode is received.

10. The image processing apparatus according to claim 8, wherein the group of the second hierarchical layer includes a plurality of groups, and wherein the specific condition is that each of K or more groups, including the second group, of the groups of the second hierarchical layer is the specific group including the specific page data, K being an integer of 2 or larger.

11. The image processing apparatus according to claim 1, wherein the target file is a PDF (Portable Document Format) file, and wherein the classification data is bookmark information included in the PDF file.

12. A non-transitory computer readable storage medium storing a program, the program, when executed by a computer, causing the computer to perform:

receiving a target file including m page data relating to m pages and classification data classifying the m page data into n groups, m being an integer of 3 or larger, n being an integer of 2 or larger and smaller than m, each of the m page data relating to a corresponding one of the m pages, and each of the n groups including at least one page data of the m page data;

causing a monitor to display an input screen for inputting information of a character string designated by a user;

receiving information of the designated character string through the input screen;

extracting specific page data relating to a page including the designated character string from the m page data by analyzing the target file;

determining a specific group of the n groups by using the classification data, the specific group including the extracted specific page data;

determining target page data to be printed by a printing execution unit, of the page data included in the specific group, the target page data including the specific page data and page data different from the specific page data; and causing the printing execution unit to print the target page data.

13. The storage medium according to claim 12, wherein the determining of the target page data is performed by determining all of the page data included in the specific group as the target page data.

14. The storage medium according to claim 12, wherein the extracting of the specific page data is performed by extracting first specific page data relating to a first page including the designated character string and second specific page data relating to a second page including the designated character string, wherein the program, when executed by the computer, causes the computer to further perform:

receiving a selection instruction of a page from the user by causing the monitor to display the first page and the second page, and wherein the determining of the target page data is performed by:

determining page data included in a first specific group including the first specific page data as the target page data, in a case where the selection instruction to select the first page is received; and determining page data included in a second specific group including the second specific page data as the target page data, in a case where the selection instruction to select the second page is received.

15. The storage medium according to claim 12, wherein the extracting of the specific page data is performed by extracting first specific page data relating to a first page including the designated character string and second specific page data relating to a second page including the designated character string, wherein the program, when executed by the computer, causes the computer to further perform:

receiving a selection instruction of a page from the user by causing the monitor to display a third page different from the first page and a fourth page different from the second page, the third page being included in a first specific group including the first specific page data and determined using the classification data, and the fourth page being included in a second specific group including the second specific page data and determined using the classification data, and wherein the determining of the target page data is performed by:

determining page data included in the first specific group including the first specific page data as the target page data, in a case where the selection instruction to select the third page is received; and determining page data included in the second specific group including the second specific page data as the target page data, in a case where the selection instruction to select the fourth page is received.

16. The storage medium according to claim 12, wherein the program, when executed by the computer, causes the computer to further perform:

causing the monitor to display a selection screen for selecting one mode from a plurality of printing modes including a first printing mode and a second printing mode; and receiving, from the user, a selection instruction through the selection screen, and wherein the determining of the target page data is performed by:

determining all of the page data included in the specific group as the target page data, in a case where the selection instruction to select the first printing mode is received, and determining only some of the page data included in the specific group as the target page data, in a case where the selection instruction to select the second printing mode is received.

17. The storage medium according to claim 12, wherein the classification data indicates a hierarchy structure including: one or more groups of a first hierarchical layer including a first group; and a group of a second hierarchical layer including a second group, the second hierarchical layer being a lower hierarchical layer than the first hierarchical layer, and wherein the determining of the target page data is performed by:

determining all of the page data included in the first group as the target page data, in a case where a specific condition, which includes a condition that the second group is the specific group including the specific page data, is satisfied.

18. The storage medium according to claim 17, wherein the program, when executed by the computer, causes the computer to further perform:

causing the monitor to display a selection screen for selecting one mode from a plurality of printing modes including a third printing mode and a fourth printing mode;

receiving, from the user, a selection instruction through the selection screen, wherein the determining of the target page data is performed by:

determining all of the page data included in the first group as the target page data, in a case where the second group is the specific group including the specific page data and the selection instruction to select the third printing mode is received; and determining page data included in the second group as the target page data and not determining page data included in the first group and not included in the second group as the target page data, in a case where the second group is the specific group comprising the specific page data and the selection instruction to select the fourth printing mode is received.

19. The storage medium according to claim 17, wherein the group of the second hierarchical layer includes a plurality of groups, and wherein the specific condition is that each of K or more groups, including the second group, of the groups of the second hierarchical layer is the specific group including the specific page data, K being an integer of 2 or larger.

20. The storage medium according to claim 12, wherein the target file is a PDF (Portable Document Format) file, and wherein the classification data is bookmark information included in the PDF file.

\* \* \* \* \*

UNITED STATES PATENT AND TRADEMARK OFFICE
CERTIFICATE OF CORRECTION

PATENT NO. : 10,853,000 B2  
APPLICATION NO. : 16/261707  
DATED : December 1, 2020  
INVENTOR(S) : Yoshihiro Itogawa Page 1 of 1

It is certified that error appears in the above-identified patent and that said Letters Patent is hereby corrected as shown below:

In the Claims

Column 18, Claim 5, Lines 4-5:  
Please delete "the one or more target page data" and insert --the target page data--

Column 18, Claim 7, Lines 36-37:  
Please delete "a second printing mode:" and insert --a second printing mode; and--

Column 19, Claim 9, Lines 3-4:  
Please delete "a fourth printing mode;" and insert --a fourth printing mode; and--

Column 19, Claim 9, Line 6:  
Please delete "the selection screen" and insert --the selection screen, and--

Column 21, Claim 18, Lines 17-18:  
Please delete "a fourth printing mode;" and insert --a fourth printing mode; and--

Column 21, Claim 18, Line 20:  
Please delete "the selection screen" and insert --the selection screen, and--

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*